(12) United States Patent
Tidesten

(10) Patent No.: US 11,242,581 B2
(45) Date of Patent: Feb. 8, 2022

(54) WEAR RESISTANT ALLOY

(71) Applicant: Uddeholms AB, Hagfors (SE)

(72) Inventor: Magnus Tidesten, Hagfors (SE)

(73) Assignee: Uddeholms AB, Hagfors (SE)

( * ) Notice: Subject to any disclaimer, the term of this patent is extended or adjusted under 35 U.S.C. 154(b) by 87 days.

(21) Appl. No.: 15/527,233

(22) PCT Filed: Dec. 15, 2015

(86) PCT No.: PCT/SE2015/051352
§ 371 (c)(1),
(2) Date: May 16, 2017

(87) PCT Pub. No.: WO2016/099390
PCT Pub. Date: Jun. 23, 2016

(65) Prior Publication Data
US 2018/0044766 A1    Feb. 15, 2018

(30) Foreign Application Priority Data

Dec. 17, 2014 (EP) .................................... 14198569
Jul. 3, 2015 (SE) .................................... 1550965-6

(51) Int. Cl.
| | | |
|---|---|---|
| *C22C 32/00* | (2006.01) | |
| *C22C 38/12* | (2006.01) | |
| *C22C 1/04* | (2006.01) | |
| *C22C 33/02* | (2006.01) | |
| *C22C 19/03* | (2006.01) | |
| *C22C 38/02* | (2006.01) | |
| *C22C 38/04* | (2006.01) | |
| *C22C 38/06* | (2006.01) | |
| *C22C 38/22* | (2006.01) | |
| *C22C 38/24* | (2006.01) | |
| *C22C 38/32* | (2006.01) | |
| *C22C 38/44* | (2006.01) | |
| *C22C 38/48* | (2006.01) | |
| *C22C 38/54* | (2006.01) | |

(52) U.S. Cl.
CPC ........ *C22C 32/0047* (2013.01); *C22C 1/0433* (2013.01); *C22C 19/03* (2013.01); *C22C 33/0278* (2013.01); *C22C 33/0285* (2013.01); *C22C 38/02* (2013.01); *C22C 38/04* (2013.01); *C22C 38/06* (2013.01); *C22C 38/12* (2013.01); *C22C 38/22* (2013.01); *C22C 38/24* (2013.01); *C22C 38/32* (2013.01); *C22C 38/44* (2013.01); *C22C 38/48* (2013.01); *C22C 38/54* (2013.01); *B22F 2998/00* (2013.01); *B22F 2998/10* (2013.01); *Y02P 10/25* (2015.11)

(58) Field of Classification Search
CPC ...... C22C 32/00; C22C 32/0047; C22C 38/12
USPC ......................................................... 420/53
See application file for complete search history.

(56) References Cited

U.S. PATENT DOCUMENTS

| | | | |
|---|---|---|---|
| 4,318,733 A | * | 3/1982 | Ray ........................ B22F 9/008 419/33 |
| 4,362,553 A | | 12/1982 | Ray et al. |
| 4,961,781 A | | 10/1990 | Morishita et al. |
| 5,591,391 A | | 1/1997 | Igarashi et al. |
| 5,854,434 A | | 12/1998 | Saito et al. |

FOREIGN PATENT DOCUMENTS

| | | |
|---|---|---|
| CN | 101182620 A | 5/2008 |
| CN | 101624678 A | 1/2010 |
| CN | 103014492 A | 4/2013 |
| CN | 103874774 A | 6/2014 |
| CN | 107109593 A | 8/2017 |
| GB | 2187757 A | 9/1987 |
| JP | S62-044507 A | 2/1987 |
| JP | S63-042357 A | 2/1988 |
| JP | S63-114946 A | 5/1988 |
| JP | H02200748 A | 8/1990 |
| JP | H07179997 A | 7/1995 |
| JP | 2002022891 A | 1/2002 |
| RU | 2360992 C1 | 7/2009 |

OTHER PUBLICATIONS

Office Action and Search Report, Taiwanese patent application No. 104142470, dated Nov. 30, 2018. (English Translation).
Office Action, corresponding Ukraine patent application No. 2017 07445 dated Jan. 16, 2019. (English Translation).
Extended European Search Report for European Patent Application No. 15870463.5, dated Apr. 10, 2018.
Office Action, corresponding in European Application No. 14198569. 7, dated Apr. 11, 2018.
Office Action, corresponding in Chinese Application No. 201580060666. 9, dated May 22, 2018. (English Translation).
Office Action, corresponding Chinese Application No. 201580060666. 9, dated May 13, 2019.
International Search Report and Written Opinion for Application No. PCT/US2015/051352, dated Feb. 18, 2016.
Office Action, corresponding Japanese patent application No. 2017- 529842 dated Jul. 31, 2019. (English Translation).
Search Report for Application No. U.S. patent application No. 2017120907, dated Jul. 24, 2019. (English Translation).

(Continued)

*Primary Examiner* — Weiping Zhu
(74) *Attorney, Agent, or Firm* — Karceski IP Law, PLLC

(57) ABSTRACT

The invention relates to an alloy produced by powder metallurgy and having a non-amorphous matrix, the alloy consists of in weight % (wt. %): C 0-2.5 Si 0-2.5 Mn 0-15 Cr 0-25 Mo 4-35 B 0.2-2.8 optional elements, balance Fe and/or Ni apart from impurities, wherein the alloy comprises 3-35 volume % hard phase particles, the hard phase particles comprises at least one of borides, nitrides, carbides and/or combinations thereof, at least 90% of the hard phase particles have a size of less than 5 µm and at least 50% of the hard phase particles have a size in the range of 0.3-3 µm.

16 Claims, 1 Drawing Sheet

(56) References Cited

OTHER PUBLICATIONS

Office Action, corresponding in Brazilian Application No. BR112017009295-6, dated Sep. 26, 2019.
Australian Office Action dated Apr. 27, 2020, for Australian Patent Application No. 2015363754.
Indian Office Action dated Nov. 16, 2020, for Indian Patent Application No. 201727021834.
European Office Action dated Feb. 2, 2021, for European Patent Application No. 15870463.5.
Chinese Office Action dated Jan. 19, 2021, for Chinese Patent Application No. 201911003552.7.
Vietnamese Office Action dated Jan. 29, 2021, for Vietnamese Patent Application No. 1-2017-01415.
Brazilian Office Action dated Mar. 18, 2021, for Brazilian Patent Application No. BR112017009295-6.
Korean Office Action dated Jan. 18, 2021, for Korean Patent Application No. 10-2020-7014647.

* cited by examiner

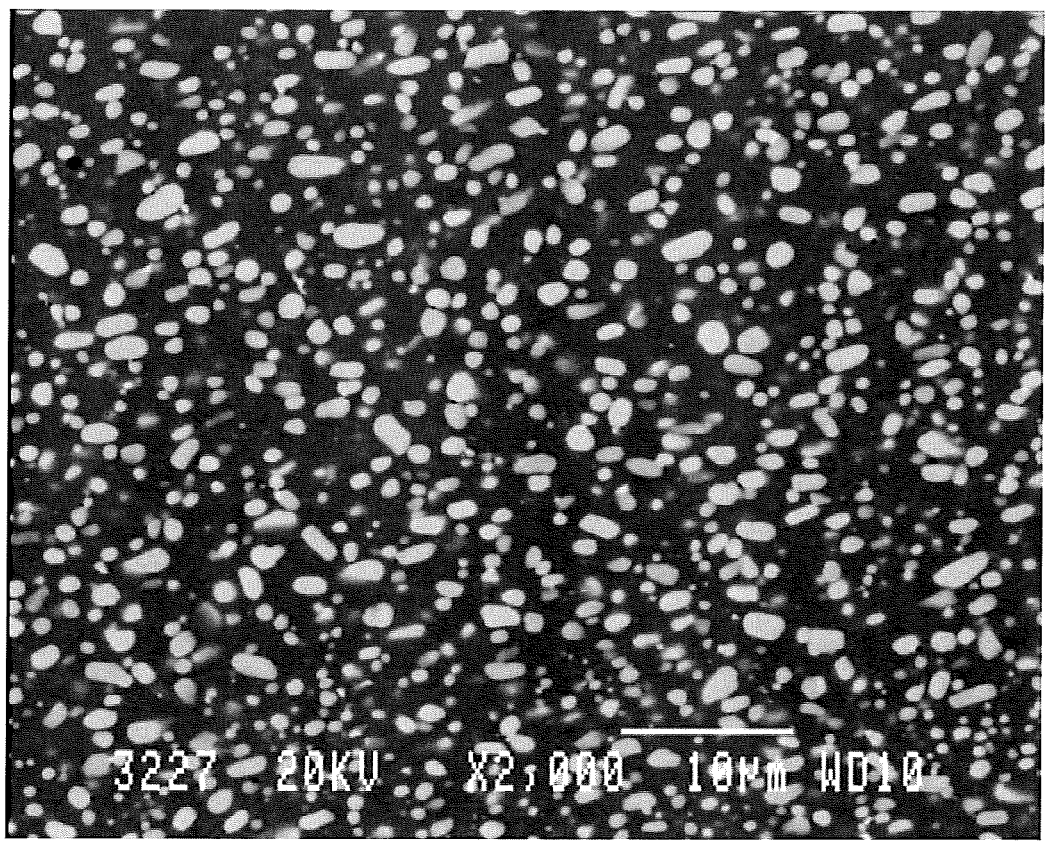
Microstructure of the inventive alloy. The white phase is $Mo_2FeB_2$. The length of the bar is 10 μm.

WEAR RESISTANT ALLOY

TECHNICAL FIELD

The invention relates to a wear resistant Fe- and/or Ni-based alloy. The alloy is alloyed with boron in order to form hard phase particles.

BACKGROUND OF THE INVENTION

Nitrogen and vanadium alloyed powder metallurgy (PM) tool steels attained a considerable interest because of their unique combination of high hardness, high wear resistance and excellent galling resistance. These steels have a wide rang of applications where the predominant failure mechanisms are adhesive wear or galling. Typical areas of application include blanking and forming, fine blanking, cold extrusion, deep drawing and powder pressing. The basic steel composition is atomized, subjected to nitrogenation and thereafter the powder is filled into a capsule and subjected to hot isostatic pressing (HIP) in order to produce an isotropic steel. A high performance steel produced in this way is described in WO 00/79015 A1.

Although the known steel has a very attractive property profile there is a continuous strive for improvements of the tool material in order to further improve the surface quality of the products produced as well as to extend the tool life, in particular under severe working conditions, requiring a good resistance against galling and abrasive wear at the same time. In many applications it is a desire that the material also should be corrosion resistant.

DISCLOSURE OF THE INVENTION

The object of the present invention is to provide powder metallurgy (PM) produced alloy having an improved property profile for advanced forming applications.

Another object of the present invention is to provide a powder metallurgy (PM) produced alloy having a composition and microstructure leading to improvements in the surface quality of products produced by the use of the alloy in tools and moulds.

The foregoing objects, as well as additional advantages are achieved to a significant measure by providing an alloy having a composition and microstructure as set out in the claims.

The invention is defined in the claims.

DETAILED DESCRIPTION

The present invention relates to an alloy comprising a hard phase consisting mainly of multiple borides containing Fe and/or Ni in a Fe- and/or Ni-based matrix. Preferably, the matrix is hardenable. The double boride is of the type $M_2M'B_2$, where M and M' stand for metals of the multiple boride. Said boride forming elements are generally selected from Cr, Mo, W, Ti, V, Nb, Ta, Hf and Co. In the present case M is Mo and M' is Fe and/or Ni. However, the boride may contain substantial amounts of one ore more of the other boride forming elements. However, in the following the double boride will be referred to as $Mo_2FeB_2$ for the Fe-based alloys although the boride also may contain Ni and one or more of the above mentioned boride forming elements. Similarly, in the Ni-based alloys the double boride will be referred to as $Mo_2NiB_2$. The size of the hard phase particles may be determined by microscopic image analysis. The size thus obtained is the diameter corresponding to the diameter of a circle with the same projected area as the particle, the Equivalent Circle Diameter (ECD).

The importance of the separate elements and their interaction with each other as well as the limitations of the chemical ingredients of the claimed alloy are briefly explained in the following. All percentages for the chemical composition of the steel are given in weight % (wt. %) throughout the description. The upper and lower limits of the individual elements may be freely combined within the limits set out in claim 1.

Carbon (0-2.5%)

Carbon need not be present in Ni-based alloys. However, in many Fe-based alloys carbon need to be present. Low carbon contents like ≤0.15%, ≤0.05%, ≤0.03 or even ≤0.01% are used in different types of stainless steels. The lower limit may therefore be set to 0.005%, 0.01%, 0.02% or 0.03%. Carbon may be included in an amount of 0.02-0.9%, 0.05-0.5%, 0.05-0.2% or 0.05-0.25%, in particular to form fine precipitated NbC in Alumina Forming Austenitic (AFA) stainless steels. On the other hand, the minimum of carbon may in many tool steels be set to 0.1% or 0.2%, 0.3% or 0.35%. The upper limit for carbon is 2.5%. Carbon is important for the formation of carbides and for the hardening in tool steels. Preferably, the carbon content is adjusted in order to obtain 0.4-0.6% C dissolved in the matrix at the austenitizing temperature resulting in a high strength matrix after quenching. The austenitizing temperature is preferably 1080-1120° C. In any case, the amount of carbon should in be controlled such that the amount of carbides of the type $M_{23}C_6$, $M_7C_3$, $M_6C$, $M_2C$ and MC in the steel is limited. The upper limit may therefore be set to 2.1%, 1.5%, 1.3%, 1.0%, 0.8%, 0.6%, 0.5% or 0.45%.

Chromium (0-25%)

Chromium is commonly present in Ni- and Fe-based alloys. The lower limit is 0%. However, in Fe-based alloys Chromium is in many applications present in contents of at least 0.5%, 1%, 1.5%, 2%, 3% or 3.5% in order to provide a sufficient hardenability. Cr is preferably higher for providing a good hardenability in large cross sections during heat treatment. If the chromium content is too high, this may lead to the formation of undesired carbides, such as $M_7C_3$. In addition, this may also increase the propensity of retained austenite in the microstructure. For achieving a good hardenability it is desirable to have at least 2% Cr, preferably 2.5%, %, 3%, 3.5% or 4% dissolved in the matrix. For stainless application sit is preferable that the alloy contains at least 11%, 12% or 13% Cr in the matrix. The lower limit may be set to 3.1%, 3.2%, 3.4%, 3.6%, 3.8%, 4.0% or 4.2%. The upper limit may be set to 7.0%, 6.5%, 6.0%, 5.4%, or 4.6%. On the other hand, chromium contents of more then 10%, preferably more than 12% are used for stainless applications. The upper limit for stainless alloys is 25% and may be set to 20%, 19%, 18%, 17%, 16%, 15%, 14% or 13%.

Molybdenum (4-35%)

Mo is the main element forming the hard boride. In the present invention, a high amount of Molybdenum is used in order to obtain a desired precipitation of the boride $Mo_2FeB_2$ in an amount of 3-35 vol. %. Molybdenum shall be present in an amount of at least 4%. The lower limit may be 5%, 6%, 7%, 8%, 9%, 10%, 11%, 12%, 13%, 14%, 15%, 16%, 17%, 18% 19% or 20%. The upper limit is 35% in order to avoid problem with brittleness. The upper limit may be set to 34%, 33%, 32%, 31%, 30%, 29%, 28%, 27%, 26%, 25%, 24%, 23% or 22%. Preferred ranges include 8-32%, 12-30% and 15-25%. Mo is also known to have a very favourable effect on the hardenability is essential for attaining a good secondary hardening response. For this reason it is preferred that the amount of Mo remaining in the matrix after quenching form 1100° C. is 1.5-2.5%. However, too much Mo dissolved in the matrix after hardening may result in too high an amount of retained austenite and a reduced hardness. For this reason it is desirable to balance the Mo content to the Mo-containing hard boride phases such that the matrix does not contain more than 4% or 3.5% dissolved Mo, preferably not more than 3.2% Mo. A preferred range of dissolved Mo may be set to 2.1-3.1%. For this reason the ratio Mo/B may preferably be adjusted to the range 7-18, more preferably 9-12. Another reason for balancing the ratio Mo/B is to avoid to much surplus of Molybdenum, which may lead to the formation of the hexagonal phase $M_2C$, where M mainly is Mo and/or V. The amount of the phase $M_2C$ may be limited to ≤1.5 vol. %, preferably ≤1 vol. % or even ≤0.5 vol. %.

Boron (0.2-2.8%)

Boron, which is the main hard phase-forming element, should be at least 0.2% so as to provide the minimum amount of 3% hard phase $Mo_2FeB_2$. The amount of B is limited to 2.8% for not making the alloy to brittle. The lower may be set to 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9% or 2.0%. The upper limit may be set to 2.7%, 2.6%, 2.5%, 2.4%, 2.3% or 2.2%.

Tungsten (≤22%)

Tungsten may be present in an amount of up to 22% because high contents W are often used in Ni-based alloys, high speed steels (HSS) and in T-type tool steels. The effect of tungsten is similar to that of Mo. However, for attaining the same effect it is necessary to add twice as much W as Mo on a weight % basis. Tungsten is expensive and it also complicates the handling of scrap metal. In Fe-based alloys the maximum amount may therefore be limited to 3%, 2.5%, 2%, 1.9%, 1.8%, 1.7%, 1.6%, 1.5%, 1%, 0.5% or 0.3%.

Vanadium (≤15%)

Vanadium forms evenly distributed primary and secondary precipitated carbides of the type MC. In the inventive steel M is mainly vanadium but Cr and Mo may be present to some extent. The maximum addition of V is restricted to 15% and the preferred maximum amount is 5%. However, in the present case V is mainly added for obtaining a desired composition of the steel matrix before hardening. The addition may therefore be limited to 2.0%, 1.5%, 1.0%, 0.9%, 0.8%, 0.7%, 0.6% or 0.5%. The lower limit may be set to 0.05%, 0.1%, 0.12%, 0.14%, 0.16%, 0.15% or 0.2%. A preferred range is 0.1-0.5% V.

Niobium (≤15%)

Niobium is similar to vanadium in that it forms MC. However, for attaining the same effect it is necessary to add twice as much Nb as V on a weight % basis. Nb also results in a more angular shape of the MC. Hence, the maximum addition of Nb is restricted to 15% and the preferred maximum amount is 5%. The upper limit may be set to 4%, 3%, 2%, 1%, 0.5%, 0.3%, 0.1% or 0.05%. Niobium may be included to form fine precipitated NbC in Alumina Forming Austenitic (AFA) stainless steels. The preferred content is then 0.1-1.5%.

Silicon (≤2.5%)

Silicon may used for deoxidation. Si also increases the carbon activity and is beneficial for the machinability. For a good deoxidation, it is preferred to adjust the Si content to at least 0.1%. Si is therefore preferably present in an amount of 0.1-2.5%. The lower limit may be set to 0.15%, 0.2%, 0.25%, 0.3%, 0.35% or 0.4%. However, Si is a strong ferrite former and should be limited to 2.5%. The upper limit may be set to 1.5%, 1%, 0.8%, 0.7% or 0.6%. A preferred range is 0.2-0.8%. Si is not desired in high amount in certain alloys like some types of aluminium alloyed stainless steels. The upper limit may therefore also be set to 0.6%, 0.5%, 0.4%, 0.3%, 0.2%, 0.1% or 0.05%.

Manganese (0-15%)

Mn is an austenite former and increases the solubility for nitrogen in the alloy. Mn may therefore be present in amounts of up to 15%. Manganese contributes to improving the hardenability of steel and together with sulphur manganese contributes to improving the machinability by forming manganese sulphides. Manganese may therefore be present in a minimum content of 0.1%, preferably at least 0.2%. At higher sulphur contents manganese prevents red brittleness in the steel. The upper limit may be set to 10%, 5%, 2.5%, 1.5%, 1.2%, 1.0%, 0.8% or 0.6%. However, preferred ranges are 0.2-0.8% and 0.2-0.6% in Fe-based alloys.

Nickel

Nickel may be used as balance to make Ni-based products having $Mo_2NiB_2$ as the dominating hard phase. However, in the Fe-based alloys Ni is optional and may preferably be present in an amount of not more than 25%, 20% or 15%. It gives the steel a good hardenability and toughness. Nickel can be used for forming an intermetallic phase together with Al and is therefore used for precipitation strengthening in maraging steels. In addition, Ni is indispensible in AFA-alloys and is then often present in amounts in the range of 10-30%. Because of the expense, the nickel content in many steels is limited. Accordingly, the upper limited may be set to 5%, 2%, 1.0% or 0.3% in the Fe-based alloys.

Iron

Iron may be used as balance to make Fe-based products having $Mo_2FeB_2$ as the dominating hard phase. However, in the Ni-based alloys Fe is optional and may be present in an amount of not more than 15%. The upper limit may be 8%, 7%, 6%, 5%, 4% or 3%.

Copper (≤5.0%)

Cu is an optional element, which may contribute to increasing the hardness and the corrosion resistance of the steel. The upper limit may be 4%, 3%, 2%, 1%, 0.9%, 0.7%, 0.5%, 0.3% or 0.1%. However, it is not possible to extract copper from the steel once it has been added. This drastically makes the scrap handling more difficult. For this reason, copper is normally not deliberately added.

Cobalt (≤20%)

Co is an optional element, which may be present in an amount of not more than 20% %. Co dissolves in iron (ferrite and austenite) and strengthens it whilst at the same time imparting high temperature strength. Co increases the $M_s$ temperature. Co can substitute mainly Fe in the $Mo_2FeB_2$ boride. Cobalt is often used in high speed steels. However, Co is expensive. The upper limit may therefore be set to 8%, 7%, 6%, 5%, 4% or 3%. A preferred maximum content is 2%. However, scrap handling will be more difficult. For this reason, Co need not be deliberately added Ti, Ta, Zr, Hf, Y and REM These elements can form borides, nitrides oxides and/or carbides and may be present in the alloy in the claimed ranges for one or more purposes such as altering the composition of the hard phases, improving the oxidation resistance. REM stands for Rare Earth Metals and includes the elements having the atomic number 21 or 57-71. However, for many applications none of these elements are deliberately added.

Phosphorous

P is an impurity element and a solid solution strengthening element. However, P tends to segregate to the grain boundaries, reduces the cohesion and thereby the toughness. P is therefore normally limited to ≤0.05%.

Sulphur (≤0.5%)

S contributes to improving the machinability of the steel. At higher sulphur contents there is a risk for red brittleness. Moreover, a high sulphur content may have a negative effect on the fatigue properties of the steel. The steel shall therefore contain ≤0.5%, preferably ≤0.03%.

Nitrogen (≤0.5%)

Nitrogen is an optional component. N can be present in solid solution but may also be found in the hard phase particles together with B and C. The upper limit may be 0.4%, 0.3%, 0.2%, 0.15%, 0.1%, 0.05% and 0.03%.

Aluminium (≤7%)

Aluminium is an optional component. Al can be added in order to deoxidise the alloy, for forming intermetallic compounds or for providing oxidation resistance. In particular, Aluminium can be used in ferritic alloys of the type FeCrAl or FeCrAlY as well as in Alumina Forming Austenitic (AFA) stainless steels. In the latter type of alloys the minimum content may be set to 0.8%, 1.0%, 1, 2%, 1.4%, 1.6% or 2%. The lower limit for deoxidation may be set to 0.005%, 0.01% or 0.03%. If Al is used for forming a protective surface layer of alumina, then the lower limit may be set to 1%, 1.5%, 2%, 2.5% or 3%. The upper limit is 7% but may be set to 6%, 5%, 4.5%, 4% or 3.5%.

The steel may be used in powder form for additive manufacturing (AM), in particular by use of commercial units for laser melting or electron beam melting. It can thus be used for providing a wear resistant cladding on a substrate. The powder can also be used for flame spraying or the like.

The alloy produced by powder metallurgy, preferably by gas atomizing, and has a non-amorphous matrix, the alloy consists of in weight % (wt. %):

| | |
|---|---|
| C | 0-2.5 |
| Si | 0-2.5 |
| Mn | 0-15 |
| Mo | 4-35 |
| B | 0.2-2.8 |
| Cr | 0-25 |
| V | ≤15 |
| Nb | ≤15 |
| Ti | ≤5 |
| Ta | ≤5 |
| Zr | ≤5 |
| Hf | ≤5 |
| Y | ≤3 |
| Co | ≤20 |
| Cu | ≤5 |
| W | ≤22 |
| S | ≤0.5 |
| N | ≤0.5 |
| Al | ≤7 |
| REM | ≤0.5 | balance Fe and/or Ni apart from impurities, the alloy comprises 3-35 volume % hard phase particles of at least one of borides, nitrides, carbides and/or combinations thereof, preferably, at least 60% of the hard phase particles consist of $Mo_2FeB_2$ or $Mo_2NiB_2$. At least 90% of the hard phase particles have a size of less than 5 μm and at least 50% of the hard phase particles have a size in the range of 0.3-3 μm. It is preferred that the Mo/B ratio is adjusted to the range of 7-18 and that the matrix of the alloy does not contain more than 4% Mo. The steel composition and heat treatment can be selected to give the steel a ferritic, a martensitic, an austenitic or a duplex austenitic/ferritic matrix. The amount of retained austenite in a martensitic matrix may be restricted to 15 vol. %, 10 vol. %, 5 vol. % or 2 vol. %.

Example 1

10 kg of an alloy having the composition (in wt. %) given below was melted in a laboratory furnace and subjected to Ar-gas atomizing.

| | |
|---|---|
| C | 0.3 |
| Si | 0.3 |
| Mn | 0.3 |
| Mo | 19 |
| B | 2.1 |
| Fe | balance. |

The powder was sieved to <500 filled in steel capsules having a diameter of 63 mm and a height of 150 mm. HIPing was performed at a temperature of 1150° C., the holding time was 2 hours and the pressure 110 MPa. The cooling rate was <1° C./s. The material thus obtained was forged at 1130° C. to the dimension 20×30 mm. Soft annealing was performed at 900° C. with a cooling rate of 10° C./h down to 750° C. and thereafter cooling freely in air. Hardening was performed by austenitizing at 1100° C. for 30 minutes followed by quenching in water followed by tempering. The result of the hardness testing after tempering is given in Table 1.

The amount of the hard phase was found to be 24 vol. % and the borides were found to have a small size. The area fraction of borides in different size classes is given in Table 2 below.

TABLE 1

Hardness as a function of the tempering temperature after hardening from 1100° C.

| Tempering temperature (° C.) | Hardness HRC |
|---|---|
| 200 | 60 |
| 300 | 56 |
| 400 | 54 |
| 500 | 53 |
| 525 | 53 |
| 550 | 54 |
| 600 | 49 |

TABLE 2

Size distribution of the borides.

| Size range (μm) | Area fraction (%) |
|---|---|
| 0-1 | 6.3 |
| 1-2 | 13.5 |
| 2-3 | 4.0 |
| 3-4 | 0.2 |

The microstructure is shown in FIG. 1. The high area fraction and the uniform distribution of the $Mo_2FeB_2$ borides results in a material having excellent anti-galling properties such that it would be possible to dispense with surface treatments like PVD, CVD and TD.

Example 2

An alloy having the composition given below was produced as described in Example 1.

| | |
|---|---|
| C | 0.32 |
| Si | 0.44 |
| Mn | 0.3 |
| Mo | 19 |
| B | 2 |
| Cr | 11 |
| V | 0.26 |
| Fe | balance. |

The amount of the hard phase $Mo_2FeB_2$ was found to be 25.1 vol. % and the borides were found to be fine and uniformly distributed in the matrix. The composition of the matrix after hardening was calculated with Termo-Calc software using the steel database. The matrix was found to contain 12.3% Cr and 2.8% Mo, which indicate a good corrosion resistance.

Example 3

An alloy having the composition given below was produced as described in Example 1 but Nitrogen gas was used for the atomizing.

| | |
|---|---|
| C | 0.083 |
| Si | 0.45 |
| Mn | 0.64 |
| Mo | 11.1 |
| B | 1.0 |
| Cr | 11.3 |
| Nb | 0.7 |
| Ni | 15.2 |
| Al | 2.0 |
| Fe | balance. |

The amount of the hard phase $Mo_2FeB_2$ was found to be 12.6 vol. % and the borides were found to be fine and uniformly distributed in the matrix. In addition thereto the amount of MC vas found to be 0.6%, where M is mainly Nb. The calculated matrix composition was found to contain 0.02% C, 12.0% Cr, 3% Mo, 17.4% Ni, 2.3% Al and 0.2% Nb. The alloy of this example can thus be classified as a boride reinforced Alumina Forming Austenitic (AFA) stainless steel.

Example 4

A boride reinforced precipitation hardening stainless steel was produced by gas atomizing. The steel alloy had the following composition (in wt. %):

| | |
|---|---|
| C | 0.03 |
| Si | 0.3 |
| Mn | 0.3 |
| Mo | 11.0 |
| B | 1.1 |
| Cr | 11.4 |
| Ni | 7.5 |
| Al | 1.4 |
| Fe | balance. |

The amount of the hard phase $Mo_2FeB_2$ was found to be 13.9 vol. % and the borides were found to be fine and uniformly distributed in the matrix. The calculated matrix composition was found to contain 0.035% C, 12.05% Cr, 2.2% Mo, 8.6% Ni and 1.6% Al. This steel is a maraging steel that can be hardened to a desired matrix hardness in the range of 40-52 HRC by aging at temperatures of 525° C. to 600° C. As a result of the highly alloyed matrix the steel was found to have an exceptional corrosion resistance and thus being very suitable mould material for plastic moulding of plastic and rubber containing corrosive additions.

INDUSTRIAL APPLICABILITY

The alloy of the present invention is useful for a wide range of applications. In particular, the steel is useful in applications requiring very high galling resistance.

The invention claimed is:

1. An alloy produced by powder metallurgy by gas atomizing and having a non-amorphous matrix, the alloy consists of in weight % (wt. %):

| | |
|---|---|
| C | 0-0.8 |
| Si | 0-2.5 |
| Mn | 0-15 |
| Mo | 12-35 |
| B | 1.6-2.8 |
| Cr | 0-25 |
| V | ≤15 |
| Nb | ≤15 |
| Ti | ≤5 |
| Ta | ≤5 |
| Zr | ≤5 |
| Hf | ≤5 |
| Y | ≤3 |
| Co | ≤20 |
| Cu | ≤5 |
| W | ≤22 |
| S | ≤0.5 |
| N | ≤0.5 |
| Al | ≤7 |
| REM | ≤0.5 | balance Fe and/or Ni apart from impurities,
wherein the alloy comprises 15-35 volume % hard phase particles,
the hard phase particles comprise at least one of borides, nitrides, carbides and/or combinations thereof,
at least 90% of the hard phase particles have a size of less than 5 µm,
at least 50% of the hard phase particles have a size in the range of 0.3-3 µm, and
at least 60% of the hard phase particles consist of $Mo_2FeB_2$ or $Mo_2NiB_2$.

2. An alloy according to claim 1, wherein the alloy fulfills at least one of the following conditions:
the alloy comprises 15-30 volume % hard phase particles,
at least 90% of the hard phase particles have a size of ≤3 µm,
at least 80% of the hard phase particles have a size in the range of 0.3-3 µm,
the alloy has a density of ≥98% of the theoretical density (TD),
the matrix of the alloy does not contain more than 4% Mo, and
the alloy does not contain more than 5% retained austenite.

3. An alloy according to claim 1, wherein the alloy is balanced with Fe and fulfills at least one of the following conditions:

| | |
|---|---|
| C | 0.02-1.5 |
| Si | 0.1-1.5 |
| Mn | 0.1-1.5 |
| Mo | 12-30 |
| Ni | ≤25 |

-continued

| | |
|---|---|
| B | 1.6-2.5 |
| Cr | 3-20 |
| V | ≤5 |
| Nb | 0.05-1.5 |
| Ti | 0.05-1.5 |
| Ta | 0.05-1 |
| Zr | 0.05-1 |
| Hf | 0.05-1 |
| Y | 0.05-1 |
| Co | ≤8 |
| Cu | ≤0.5 |
| W | ≤3 |
| S | ≤0.03 |
| N | ≤0.1 |
| Al | 0.01-4.5 | at least 80% of the hard phase particles consist of $Mo_2FeB_2$, and
the matrix of the alloy does not contain more than 3.8% Mo.

4. An alloy according to claim 1, wherein the Ni-content is ≤5 and the alloy fulfills at least one of the following conditions:

| | |
|---|---|
| C | 0.3-0.5 |
| Si | 0.2-0.8 |
| Mn | 0.2-0.8 |
| Mo | 12-25 |
| B | 1.8-2.2 |
| Cr | 3.0-16 |
| V | 0.1-2.0 |
| Al | 1.5-3.5 |
| Nb | 0.3-1.5 |
| Al | 2-5 |
| Co | ≤2 | at least 90% of the hard phase particles consist of $Mo_2FeB_2$,
the matrix of the alloy does not contain more than 3.5% Mo, and
the alloy does not contain more than 2% retained austenite.

5. An alloy according to claim 1, wherein the alloy the alloy is balanced with Fe and fulfills at least one of the following conditions:

| | |
|---|---|
| C | 0.02-0.15 |
| Si | 0.2-0.6 |
| Mn | 0.2-0.6 |
| Mo | 12-15 |
| B | 1.6-2.0 |
| Cr | 10-25 |
| V | ≤0.7 |
| Nb | 0.5-1.5 |
| Ni | 5-25 |
| Al | 1-4. |

6. An alloy according to claim 5, wherein the alloy comprises 1-4% Al, has an austenitic matrix, and the surface of the alloy comprises a layer of $Al_2O_3$.

7. An alloy according to claim 1, wherein the alloy the alloy is balanced with Fe and fulfills at least one of the following conditions:

| | |
|---|---|
| C | 0.35-0.45 |
| Si | 0.2-0.6 |
| Mn | 0.2-0.6 |
| Cr | 10.0-15.0 |
| V | 0.1-0.5 |
| N | 0.01-0.07. |

8. An alloy according to claim 1, wherein the alloy fulfils at least one of the following conditions:

| | |
|---|---|
| V | 0.2-0.4 |
| P | <0.05 |
| S | <0.003 |
| O | <0.005. |

9. An alloy according to claim 1, wherein the alloy is balanced with Fe and the metallic matrix is hardened and fulfils the following:

| | |
|---|---|
| C | 0.4-0.5 |
| Si | 0.3-0.5 |
| Mn | 0.3-0.5 |
| Mo | 15-25 |
| Cr | 4.0-5.0 |
| V | 0.3-0.4. |

10. An alloy according to claim 1 wherein the size of the hard phase particles is ≤4 μm.

11. An alloy according to claim 1, wherein the alloy is in the form of a pre-alloyed powder obtained by atomizing an melt comprising:

| | |
|---|---|
| C | 0-2.5 |
| Si | 0.1-2.5 |
| Mn | 0.1-2.5 |
| Mo | 12-35. |

12. An alloy according to claim 1, wherein the alloy has been subjected to atomizing and hot isostatic pressing resulting in that the alloy is isotropic.

13. A tool for punching, forming, blanking, fine-blanking, extrusion, deep drawing, powder pressing or a part or mold used for die casting or plastic molding comprising the alloy of claim 1.

14. A method of making solid objects with the alloy of claim 1 by the use of any of hot isostatic pressing, powder extrusion and additive manufacturing.

15. A method of punching, forming, blanking, fine-blanking, extrusion, deep drawing or powder pressing using a tool comprising the alloy of claim 1.

16. A method of die casting or plastic molding using a mold comprising the alloy of claim 1.

* * * * *